US011866912B2

(12) United States Patent
Young et al.

(10) Patent No.: US 11,866,912 B2
(45) Date of Patent: Jan. 9, 2024

(54) DRIVE MOTOR DISPLACEMENT CONTROL

(71) Applicant: Doosan Bobcat North America, Inc., West Fargo, ND (US)

(72) Inventors: Charles Young, Bismarck, ND (US); Marty Carpenter, Bismarck, ND (US); Scott Becker, Bismarck, ND (US); Douglas Kallas, Mandan, ND (US); Matthew Kaldor, Bismarck, ND (US); Eric Zabel, Bismarck, ND (US); Boston Zachmann, Mandan, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 318 days.

(21) Appl. No.: 17/026,387

(22) Filed: Sep. 21, 2020

(65) Prior Publication Data

US 2021/0087792 A1    Mar. 25, 2021

Related U.S. Application Data

(60) Provisional application No. 62/902,731, filed on Sep. 19, 2019.

(51) Int. Cl.
*E02F 9/22*    (2006.01)
*F16H 61/47*    (2010.01)
*F16H 61/421*    (2010.01)

(52) U.S. Cl.
CPC ............ *E02F 9/2296* (2013.01); *E02F 9/225* (2013.01); *E02F 9/2235* (2013.01); *E02F 9/2253* (2013.01); *F16H 61/421* (2013.01); *F16H 61/47* (2013.01)

(58) Field of Classification Search
CPC ....... E02F 9/2269; E02F 9/2235; E02F 9/225; E02F 9/2253; E02F 9/2246; F16H 61/421; F16H 61/47
See application file for complete search history.

(56) References Cited

U.S. PATENT DOCUMENTS

| | | |
|---|---|---|
| 3,938,401 A | 2/1976 | Bauer |
| 4,739,616 A | 4/1988 | Myers |
| 5,203,168 A | 4/1993 | Oshina |
| 5,709,282 A | 1/1998 | Akira |
| 6,938,719 B2 | 9/2005 | Ishimaru |
| 7,210,293 B2 | 5/2007 | Ukasawa |
| 7,506,717 B2 | 3/2009 | Tatsuno |
| 7,698,891 B2 | 4/2010 | Haramoto |
| 7,987,941 B2 | 8/2011 | Shirao |
| 8,322,481 B2 | 12/2012 | Satake |
| 8,438,846 B2 | 5/2013 | Ohtsukasa |
| 8,521,374 B2 | 8/2013 | Karasawa |

(Continued)

OTHER PUBLICATIONS

International Searching Authority. International Search Report and Written Opinion for application PCT/ US2020/051717, dated Feb. 17, 2021. 13 pages.

*Primary Examiner* — Dustin T Nguyen

(57) ABSTRACT

A power machine can include a hydraulic drive system that includes an infinitely variable hydraulic drive motor. A run-time displacement of the hydraulic motor can be adjusted based on commanded travel speed or based on a output torque. In some case, the run-time displacement can be selected from one of a plurality of displacement ranges, such as a high range and a low range.

21 Claims, 8 Drawing Sheets

(56) References Cited

U.S. PATENT DOCUMENTS

| | | | |
|---|---|---|---|
| 8,567,186 B2 | 10/2013 | Hyodo | |
| 8,646,263 B2 | 2/2014 | Shirao | |
| 8,660,761 B2 * | 2/2014 | Anderson | F16H 61/452 |
| | | | 477/68 |
| 8,671,673 B2 | 3/2014 | Hyodo | |
| 8,985,252 B2 * | 3/2015 | Otto | B62D 11/04 |
| | | | 180/6.3 |
| 9,382,925 B2 | 7/2016 | Lacher | |
| 9,488,195 B2 | 11/2016 | Higuchi | |
| 9,506,222 B2 | 11/2016 | Britten | |
| 9,617,716 B2 | 4/2017 | Hyodo | |
| 9,970,463 B2 | 5/2018 | Kaldor | |
| 10,151,331 B2 * | 12/2018 | McDonald | E02F 9/2253 |
| 10,669,696 B2 * | 6/2020 | Takeda | F16H 61/4008 |
| 2010/0263361 A1 | 10/2010 | Kodaka | |
| 2013/0104532 A1 | 5/2013 | Ries | |
| 2013/0133966 A1 | 5/2013 | Jiang | |
| 2016/0194854 A1 | 7/2016 | Yamazaki | |
| 2016/0208458 A1 * | 7/2016 | Juricak | B60W 10/06 |

\* cited by examiner

DRIVE MOTOR DISPLACEMENT CONTROL

CROSS REFERENCE TO RELATED APPLICATION

This application claims priority to U.S. Provisional Patent Application No. 62/902,731, filed Sep. 19, 2019 and titled "Drive Motor Displacement Control," the entirety of which is incorporated herein by reference.

BACKGROUND

This disclosure is directed toward power machines. More particularly, this disclosure is directed toward controlling displacement of a drive motor of a hydraulic drive system during operation of a power machine. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Some power machines can convert power from a power source (e.g., an engine) into a form that can be used by a hydraulic drive system to move the machine (i.e., for traction control) or to operate work implements, such as a lift arm. For example, a hydraulic drive system can include at least one pump driven by the power source. The pump can be configured to drive one or more motors, which in turn, rotate axles coupled to tractive elements, such as wheels. During operation, however, the power demand from a hydraulic drive system can, in some instances, outstrip the capacity of a power source.

The discussion above is merely provided for general background information and is not intended to be used as an aid in determining the scope of the claimed subject matter.

SUMMARY

Some embodiments disclosed herein can include systems and related methods for improving operation of hydraulic drive systems by controlling displacement of an infinitely variable displacement drive motor based on commanded travel speed, output torque, or other factors.

In some embodiments, a hydraulic drive system for use in a power machine can include a hydraulic circuit and a control device. The hydraulic circuit can include a hydraulic pump in hydraulic communication with a hydraulic motor. The hydraulic motor can be configured to operate with infinitely variable displacement to drive the power machine. The control device can be configured to determine a control value based on one or more of: a commanded travel speed for the power machine or a pressure in the hydraulic circuit. The control device can be further configured to change a run-time displacement of the hydraulic motor based upon the determined control value.

In some embodiments, a hydraulic circuit of a hydraulic drive system for use in a power machine can include a hydraulic pump in hydraulic communication with a hydraulic drive motor, the hydraulic drive motor being configured to operate with infinitely variable displacement to drive the power machine. A control device can be configured to determine an output torque value associated with the hydraulic drive motor and to adjust a run-time displacement of the hydraulic drive motor based upon the determined output torque value.

In some embodiments, a method is provided to control run-time operation of a drive system of a power machine. One or more signals can be received, the one or more signals indicating one or more of a commanded travel speed for the power machine or an output torque associated with an infinitely variable displacement hydraulic drive motor of a hydraulic drive circuit of the power machine. A control value can be determined for an infinitely variable displacement hydraulic drive motor of the hydraulic drive circuit, based on the one or more signals. A run-time displacement for the hydraulic drive motor can be adjusted based on the control value.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
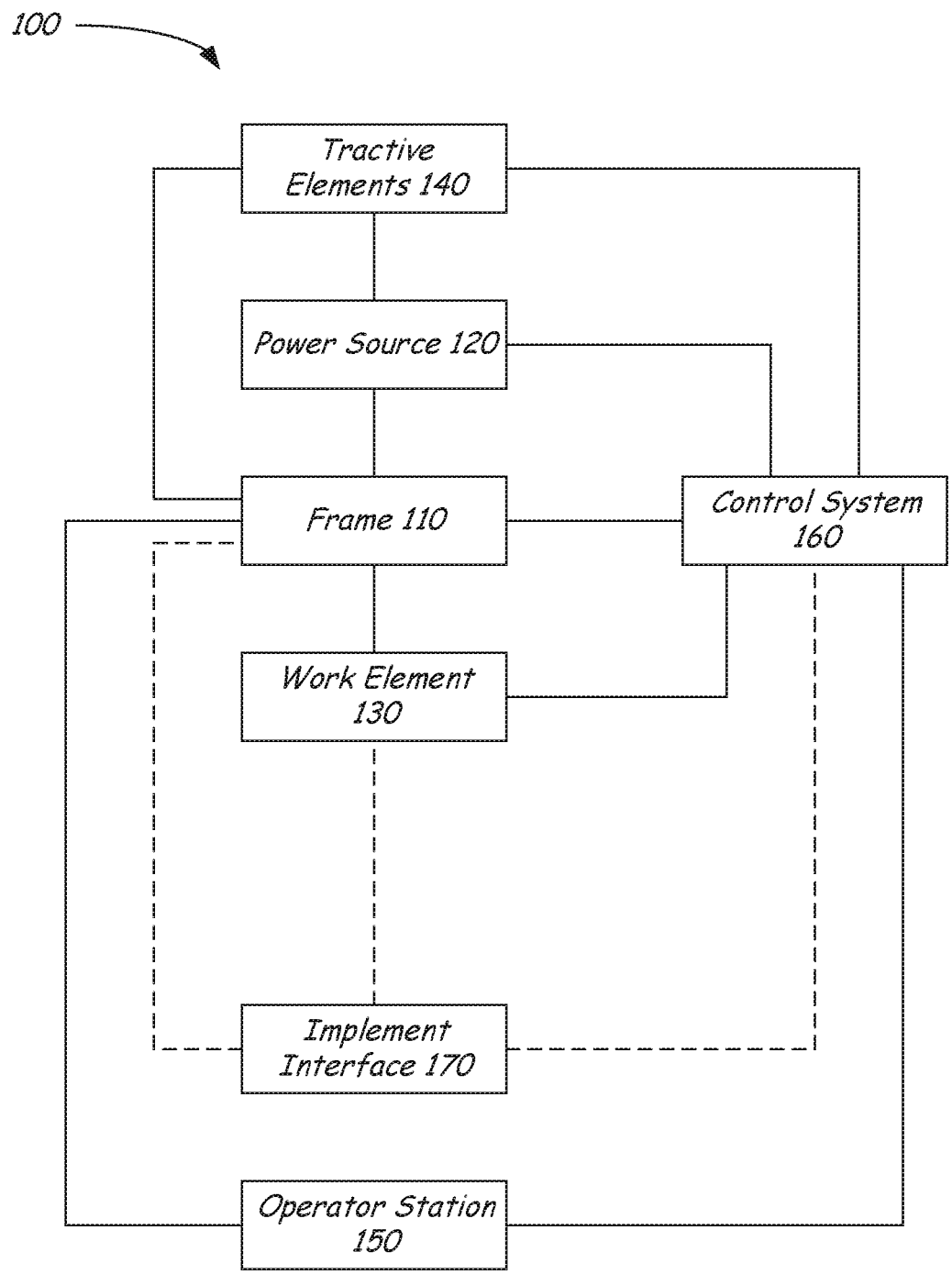
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

In some configurations, a hydraulic pump for a hydraulic drive system of a power machine is a bi-hydrostatic drive pump that is powered by a power source and that is in hydraulic communication with a drive motor for traction control. In some configurations, each lateral side of the power machine can have its own drive pump and motor combination that is powered by the power source. In other configurations, each tractive element can have its own dedicated drive pump and motor combination. A control device, such as an electronic or electro-hydraulic controller, can be configured to receive operator inputs and control the traction of the power machine by varying the displacement of the hydraulic pump, and, in some instances, the drive motor.

During operation of a power machine, the power demand from a hydraulic drive system can, in some instances, outstrip the capacity of a power source. This can cause the power source to stall, with corresponding adverse effects on active operations. Further, in other instances, other deficiencies or excesses in the immediate power capacity of a power source and an associated hydraulic drive system can cause certain power-machine systems to operate in a less than desirable manner. For these and other reasons, it may be beneficial to provide power machines with power management systems, including as it relates to operation of hydraulic drive systems.

Various embodiments disclosed herein can address these and other needs, including by providing systems and corresponding methods to control continuous displacement of a drive motor of a hydraulic drive system during operation of a power machine. For example, some embodiments can provide systems (and methods) for changing a displacement of a drive motor in response to changes in commanded travel speed for a power machine. Similarly, some embodiments can provide systems (and methods) for changing a displacement of a drive motor in response to output torque for a drive system exceeding a threshold torque value, including while keeping the associated power source at a substantially constant output. For example, for a given output of the power source and a fixed displacement of an associated hydraulic pump, motor displacement can be decreased, as needed, to achieve a commanded increase in travel speed. Similarly, for a given output of the power source and a fixed displacement of the associated hydraulic pump, motor displacement can be increased, as needed, to provide higher torque (in some cases, with a corresponding loss of travel speed).

In some embodiments, a drive system can include a hydrostatic or other hydraulic drive circuit that includes a hydraulic pump in hydraulic communication with a hydraulic motor. The hydraulic motor can be configured to operate with infinitely variable displacement to drive the power machine. A control device, such as an electronic or electro-hydraulic controller, can be configured to control displacement of the motor based on different parameters. For example, the control device can be configured to determine a control value based on (e.g., equal to) a commanded travel speed for the power machine and to reduce a run-time displacement of the hydraulic motor based upon the control value.

In some embodiments, a hydraulic motor can be configured to operate selectively in a high range and in a low range, which may be selectable by an operator of the machine. Generally, the high range and the low range can encompass respective continuously variable ranges of motor displacements, with the low range exhibiting a smaller span between maximum and minimum displacement than the high range. This stands in contrast, for example, to conventional systems in which drive motors can be controlled only to move discretely between high and low fixed-displacement settings.

In some embodiments, a maximum motor displacement of a high range can be the same as a maximum motor displacement of a low range, and a minimum displacement of the high range can be lower than a minimum displacement of the low range. For example, a high range and a low range for a hydraulic drive motor can both define the same maximum displacement, which corresponds to the maximum possible displacement for the motor. Further, the high range can define a minimum displacement that corresponds to the minimum possible displacement for the motor, and the low range can define a minimum displacement that is larger than the minimum possible displacement for the motor. Accordingly, for example, the high and low ranges can both provide maximum possible torque for traction and can overlap over a common continuous range of displacement values, but operation in the high range can allow a power machine to travel with a wider range of speeds (and torques) than the low range, including a range of faster speeds than may be possible in the low range.

In some embodiments, a control device can be configured to control a hydraulic motor to operate, as a default, at a maximum output torque level (i.e., at maximum motor displacement) and to reduce available output torque (i.e., to reduce motor displacement) only as needed to increase vehicle speed. In some embodiments, when a hydraulic motor is operating at reduced torque (i.e., not at maximum displacement), a control device can be configured to determine an output torque value associated with the hydraulic motor (e.g., via sensed pressure measurements) and to increase a run-time displacement of the hydraulic motor based upon the determined output torque value, regardless of the effect on travel speed for the power machine. In this way, for example, the control device can help to ensure that appropriate torque is provided for traction, even if this results in reduced travel speed for the power machine. In some embodiments, motor displacement can be increased only when the determined output torque value exceeds a predetermined torque threshold. Because system pressure is proportional to torque and inversely proportional to displacement, this approach can, for example, usefully reduce system pressure for a given (e.g., threshold) torque and thereby reduce strain on hydraulic components.

Thus, for example, embodiments of the disclosure can provide beneficial power management for a power machine, including as may optimally balance the sometimes-competing goals of providing necessary torque and providing a commanded travel speed. In some embodiments, for example, within either of two (or more) displacement ranges for a drive motor and starting from operation with maximum motor displacement and correspondingly maximized output torque at a traction device, the displacement of the hydraulic motor can be controllably decreased to match a commanded travel speed. Thus, maximum torque can be made available as a default, but elevated commanded travel speeds can be readily accommodated. Likewise, after reducing motor displacement to provide an increase in travel speed, displacement can then be increased, in response to sensed increase of output torque (e.g., past a threshold) to ensure that appropriate tractive torque is available without the elevated strain that can be introduced by elevated hydraulic pressures.

Figure 2:
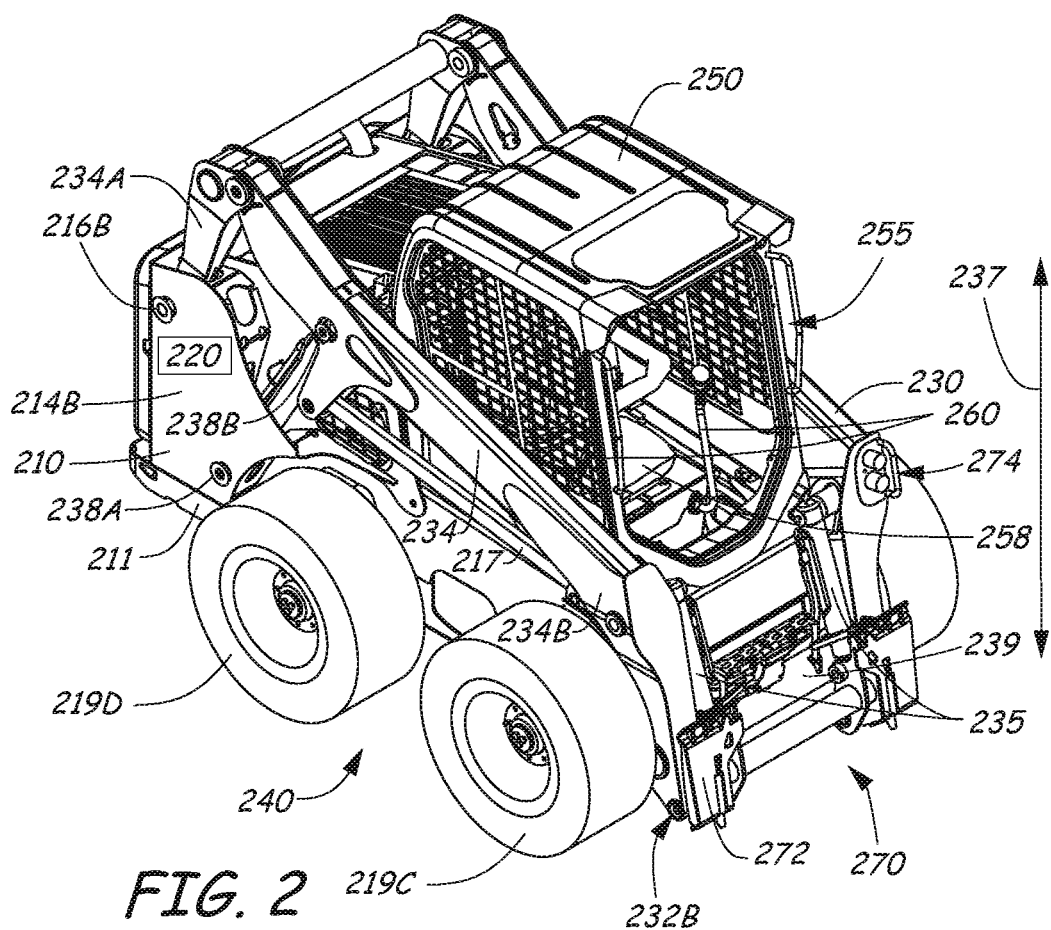
FIGS. 2-3 illustrate perspective views of a representative power machine in the form of a skid-steer loader of the type on which the disclosed embodiments can be practiced.
Figure 3:
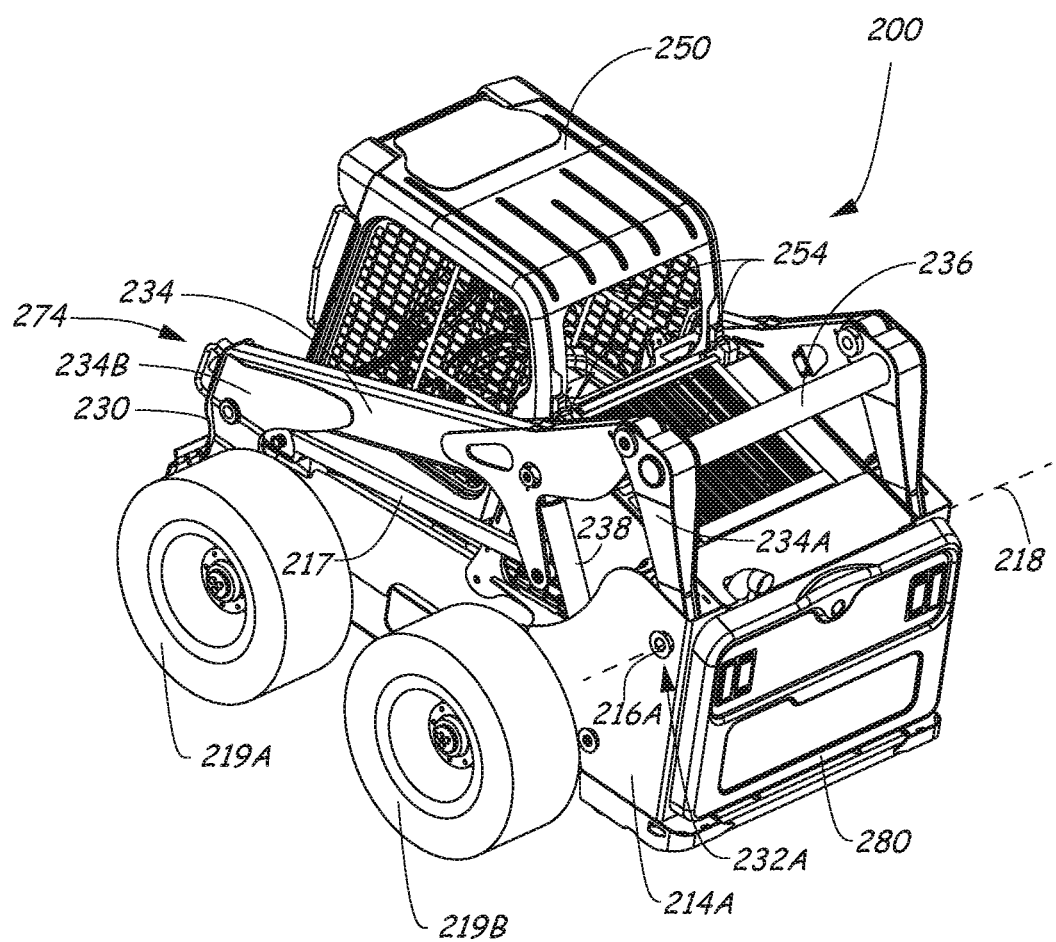

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
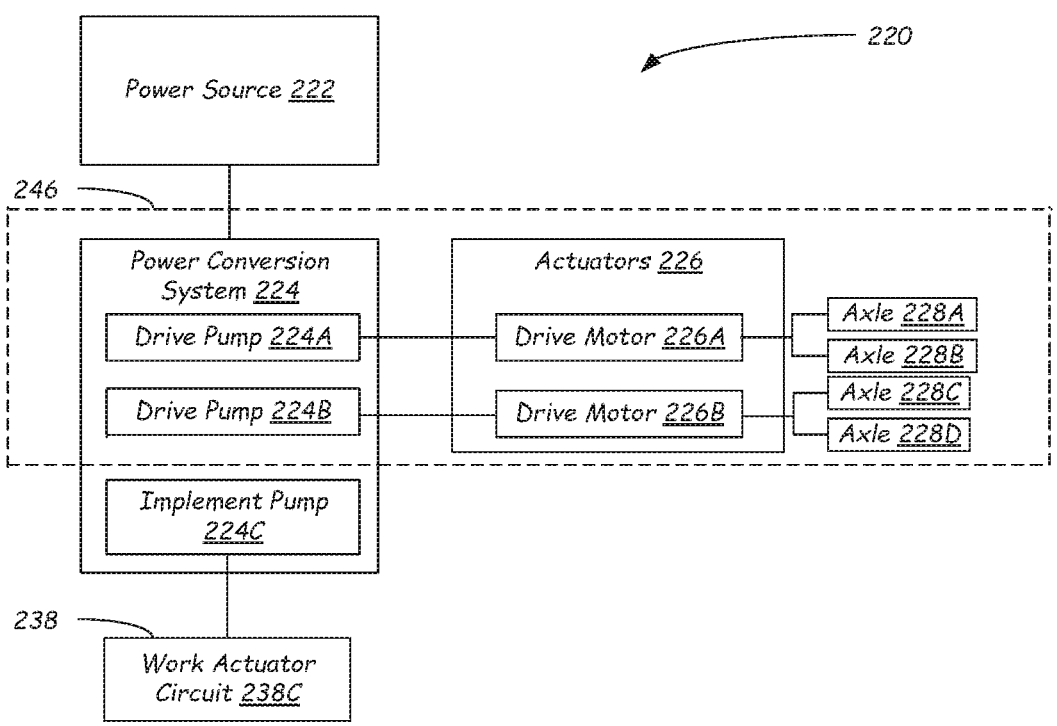
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a hydraulic drive system 246 integrated with a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which form part of the hydraulic drive system 246 and are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulically, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
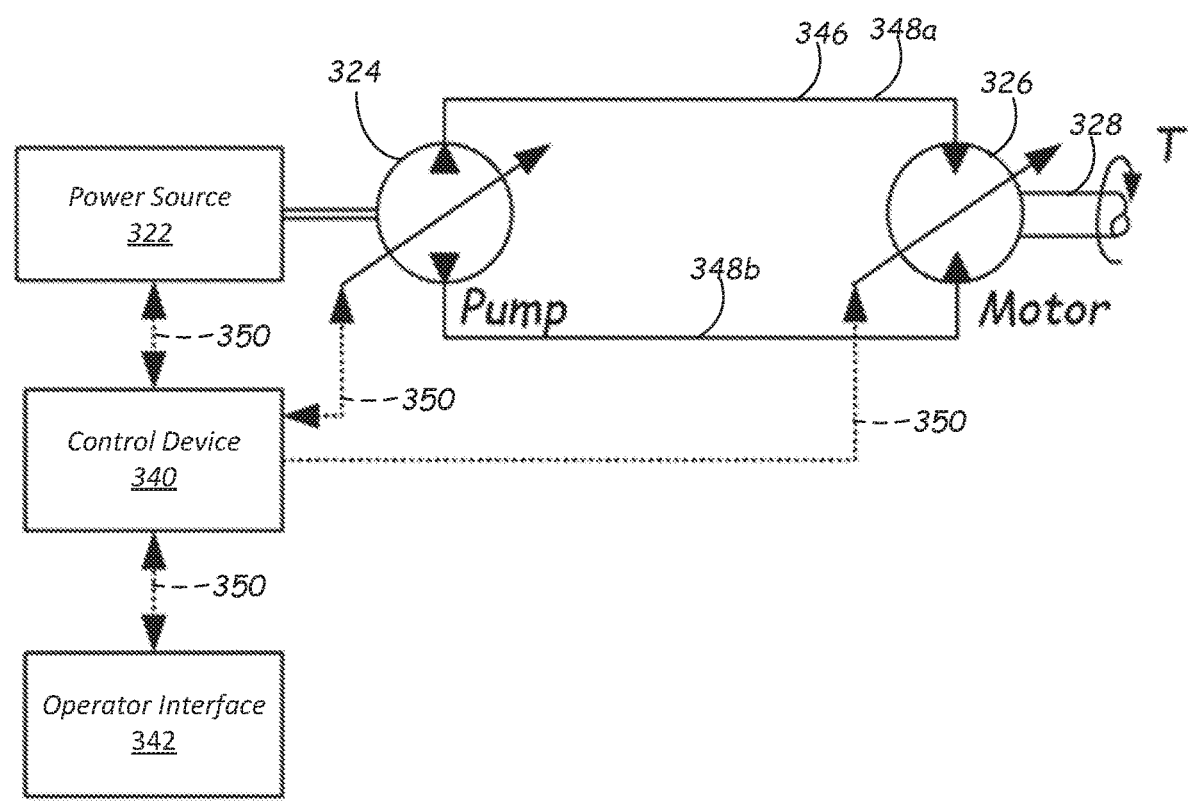
FIG. 5 is a schematic of a power machine of the type on which the disclosed embodiments can be practiced, with a hydrostatic drive system that includes a hydraulic pump in hydraulic communication with a hydraulic motor.

FIG. 5 illustrates aspects of a hydraulic drive system that can be used for traction control of a power machine, including as a configuration for the hydraulic drive system 246 of the power machine 200 of FIGS. 2 and 3. In the illustrated embodiment, the hydraulic drive system includes a hydrostatic hydraulic drive circuit 346 that includes a variable displacement hydraulic pump 324 in hydraulic communication with an infinitely variable displacement hydraulic drive motor 326, example details of which are further discussed below. In other embodiments, other types of hydraulic drive systems can be used, consistent with the general principles disclosed herein.

In the illustrated embodiment, a control device 340 is operably coupled with the hydraulic pump 324, the hydraulic motor 326, and a power source 322 (e.g., an engine) that is configured to power the hydraulic pump 324. In some implementations, the control device 340 can be configured to determine a control value based on a commanded travel speed for the power machine. The control device 340 can then adjust (e.g., reduce) a run-time displacement of the hydraulic motor 326, as needed, based upon the determined control value. Accordingly, for example, hydraulic motor 326 can be controlled to provide appropriate travel speed, with reduction of torque output only as needed.

In some embodiments, a control device the device 340) can be configured to decrease displacement of a hydraulic motor in response to a commanded travel speed exceeding a threshold speed. Motor speed is inversely proportional to torque and to displacement, and torque is proportional to displacement. Correspondingly, for example, this approach can usefully reduce torque only as may be needed to provide a particularly high travel speed. In this regard, in some implementations, a speed threshold may correspond to speeds for travel between work sites (e.g., road speeds) rather than to speeds for transport of loads or other operations within a work site.

In some implementations, the control device 340 can additionally or alternatively be configured to determine an output torque value associated with the hydraulic motor 326. The control device 340 can then adjust (e.g., increase) a run-time displacement of the hydraulic motor 326, as needed, based upon the determined output torque value, and thereby ensure that appropriate torque is available for traction. Further, in some implementations, the control device 340 can increase run-time displacement of the hydraulic motor 326, including to provide increased tractive torque, regardless of the effect of such an increase on travel speed for the power machine 100.

In different embodiments, different configurations are possible. As illustrated in FIG. 5, for example, the hydrostatic hydraulic circuit 346 includes at least one variable displacement hydraulic pump (i.e., the pump 324) that is mechanically coupled to the power source 322, which may be similar to the power source 222 described with reference to FIG. 4. The variable displacement hydraulic pump 324 is equipped with a swash plate (not shown) that can be controlled by the control device 340 to be continuously adjusted to any number of angular orientations, each corresponding to a corresponding displacement volume for the hydraulic pump 324. In addition, the swash plate may be a bi-directional swash plate such that adjustment may adjust the displacement of the hydraulic motor 326 to provide for forward or reversed flow. (As used herein, the term "bi-directional" is used to refer to a hydraulic pump or a hydraulic motor that is capable of moving fluid, such as hydraulic fluid, in either of two directions.) As such, the angle of the swash plate may vary between first, or positive, displacement orientations, such as for forward travel of the machine 100, and second, or negative, displacement orientations, such as for reverse travel of the machine 100. In other embodiments, however, a drive pump can be otherwise configured, including for control using different control structures. For example, a drive pump can be limited to unidirectional operation on hydraulic (as opposed to hydrostatic) drive systems and direction of travel can be accomplished by using control valves that are external to the drive pump to port pressurized fluid to cause tractive elements to rotate in a forward or reverse direction.

Also as illustrated in FIG. 5, for example, the infinitely variable displacement hydraulic pump 324 is fluidly coupled to the variable displacement hydraulic motor 326. The hydraulic motor 326 is also equipped with a swash plate (not shown) that can be controlled by the control device 340 to be continuously adjusted an infinite number of angular orientations, each corresponding to a corresponding displacement volume for the hydraulic motor 326. As similarly noted for the drive pump 324, other embodiments may include drive motors that can be otherwise configured, including for control using different control structures.

Thus, in the illustrated embodiment, the fluid coupling of the hydraulic motor 326 to the infinitely variable displacement hydraulic pump 324 via fluid lines 348a, 348b allows the hydraulic pump 324, as powered by the power source 322, to drive rotation of the hydraulic motor 326 and thereby power travel of the power machine over terrain. Further, the swash plate angle of the hydraulic pump 324 can be varied to determine the direction and flow rate of the hydraulic fluid that is pumped to the hydraulic motor 326, and the swash plate angle of the hydraulic motor 326 can be continuously varied to between minimum and maximum displacements to adjust an output torque T that is delivered to the associated tractive element(s) (not shown).

To determine relevant parameters and control operation of the hydraulic drive circuit 356, a controller such as the control device 340 may include various known electrical, hydraulic, and other modules, including electro-hydraulic actuators, special or general purpose computing devices, and so on. In this regard, for example, the control device 340 may include a processor, a memory, and an input/output circuit that facilitates communication to other modules that are internal and external to the control device 340. The processor may control operation of the control device 340 by executing operating instructions, such as, for example, computer readable program code stored in memory, wherein operations may be initiated internally or externally to the control device 340. The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the control device 340. Although a single control device 340 is described, it will be appreciated that some power systems can include a different number or configuration of control devices, including control devices that are distributed about the relevant power machine or located remotely from the power machine.

In the example embodiment provided in FIG. 5, the control device 340 may be in electrical, hydraulic, or other communication with the hydraulic pump 324, the hydraulic motor 326, the power source 322, and the operator interface 342 (e.g., a joystick, a touchscreen interface, etc.). Communication between each such component and the control device 340 may be effected via wired, wireless, or other communication, via one or more communication channels 350. For instance, the control device 340 may send or receive hydraulic, electronic, or other signals over the relevant communication channel 350 to adjust angles of the swash plate of the hydraulic motor 326, such as by controlling proportional solenoids or other devices. Similarly, the control device 340 may send or receive signals over the relevant communication channels 350 to determine and, in some instances, control a speed of the power source 322 (e.g., an RPM of an engine), to receive various operator commands from the operator interface 342, and to provide various outputs to the operator interface 342.

In some embodiments, one or more sensors may monitor the power system to detect various conditions and provide data signals to the control device 340, such as may inform control of the drive circuit 346 (and the drive system generally) by the control device 340 during operation of a power machine. For example, a power source sensor (not shown) may be used to detect operating speed or other operating conditions of the power source 322. Similarly, a pressure sensor (not shown) of a known type may be disposed to detect a pressure at one or more locations on the hydraulic circuit 346, another sensor (not shown) of a known type may be configured to determine a travel speed of the power machine or other related parameter (e.g., rotational speed of an axle 328), and so on.

Including for power-management reasons discussed above, the control device 340 is configured to selectively adjust the displacement of the hydraulic motor 326 during operation of the power machine. In particular, for example, the control device 340 can selectively adjust displacement of the hydraulic motor 326 in response to changes in commanded travel speed of the power machine, or in response to output torque T. In some cases, as further discussed below, the control device 340 can selectively adjust displacement of the hydraulic motor 326 in response to output torque T exceeding a threshold torque value, including when this latter adjustment results in a decrease in travel speed.

In one example, for a given output of the power source 322 and a given displacement of the hydraulic pump 324, the control device 340 can determine a control value that is based on (e.g., equal to) a travel speed that is commanded at the operator interface 342 or is measured, directly or indirectly, using one or more sensors. Based on the control value, the control device 340 can then decrease hydraulic motor 326 displacement over a continuous range of displacements, to the extent needed to achieve the commanded increase in travel speed. Further, in some implementations, converse adjustments are also possible, under which the control device 340 can increase displacement of the hydraulic motor 326 over a continuous range, to correspond to a decrease in commanded travel speed.

As another example, for a given output of the power source 322 and a given displacement of the hydraulic pump 324, the control device 340 can determine an output torque value based on (e.g., equal to) a measured output torque, such as by using pressure measurements from the hydraulic drive circuit 346 (or other data) in combination with measurements indicative of motor displacement and a locally stored look-up table or pre-programmed set of equations. As needed, such as when the output torque value exceeds a threshold value, the control device 340 can increase hydraulic motor 326 displacement over a continuous range of displacements to reduce pressure. In some implementations, such an increase in displacement for the hydraulic motor 326 can be affected regardless of any corresponding loss of travel speed. In some cases, a threshold torque may be considered as equivalent to a threshold pressure for a given displacement of a hydraulic machine, including such that increasing displacement relative a threshold torque may correspond to increasing displacement to avoid exceeding a threshold pressure. In some embodiments, a threshold torque may vary depending on operating conditions (e.g., based on current displacement of the hydraulic pump or motor 324, 326, travel speed of the power machine, etc.). Further, in some embodiments, converse adjustments are also possible, under which the control device 340 can decrease displacement of the hydraulic motor 326 over a continuous range to correspond to a decrease in output torque.

In some embodiments, the control device 340 can be configured, as a default, to implement maximum displacement at the hydraulic motor 326, for a given flow within the hydraulic drive circuit 346, and thereby to provide, as a default, maximum output torque T. For example, the control device 340 can be configured to implement maximum displacement at the hydraulic motor 326 as a default, then to decrease displacement at the motor 326 only as needed to match a commanded increase in travel speed. Further, after such a decrease in displacement, the control device 340 can then increase motor displacement, as needed, in order to ensure sufficient output torque. For example, as also noted above, the control device 340 can sometimes increase motor displacement in response to sensed increase of output torque T past a threshold torque, in order to ensure that appropriate output torque T is available without the elevated strain that can be introduced by elevated hydraulic pressures.

In some embodiments, as generally noted above, a control device may be configured to receive indications of output torque and commanded travel speed, but to prioritize one of these factors when determining an adjustment for run-time displacement of a hydraulic motor. For example, as discussed above, the control device 340 can be configured to adjust displacement of the hydraulic motor 326 in response to commanded travel speed or in response to the output torque T (e.g., as determined based on sensed pressure). In some cases, the control device 340 may receive signals corresponding to the commanded travel speed and to the output torque T, but the output torque T may be given priority over the commanded travel speed. For example, if the output torque T is determined to exceed a torque threshold, a run-time displacement of the hydraulic motor 326 may be adjusted accordingly (e.g., increased, as discussed above), even if providing the commanded travel speed might otherwise correspond to the control device 340 commanding a different decreased) run-time displacement for the hydraulic motor 326.

In some embodiments, a hydraulic motor can be controlled to operate selectively in different displacement ranges. For example, as illustrated in FIG. 6, the control device 340 can control the hydraulic motor 326 to operate selectively with displacements in a first (e.g., high) range 352 and displacements in a second (e.g., low) range 354.

In different implementations, the span of displacements included in high, low, and other displacement ranges can overlap to varying degrees. In some embodiments, including as illustrated in FIG. 6, a maximum displacement of the high range 352 for the hydraulic motor 326 can be the same as a maximum displacement of the low range 354, and a minimum displacement of the high range 352 can be lower than a minimum displacement of the low range 354. In some cases, also as illustrated in FIG. 6, a high range and a low range for a hydraulic motor can both define a maximum displacement that corresponds to the maximum possible displacement for the hydraulic motor 326. Similarly, a high range can define a minimum displacement that corresponds to the minimum possible displacement for the hydraulic motor 326, and a low range can define a minimum displacement that is larger than the minimum possible displacement for the hydraulic motor 326. Accordingly, for example, the high and low ranges can both provide maximum possible output torque T for traction, but operation in the high range can allow a power machine to travel with a wider range of speeds (and output torques T) than the low range.

Figure 6:
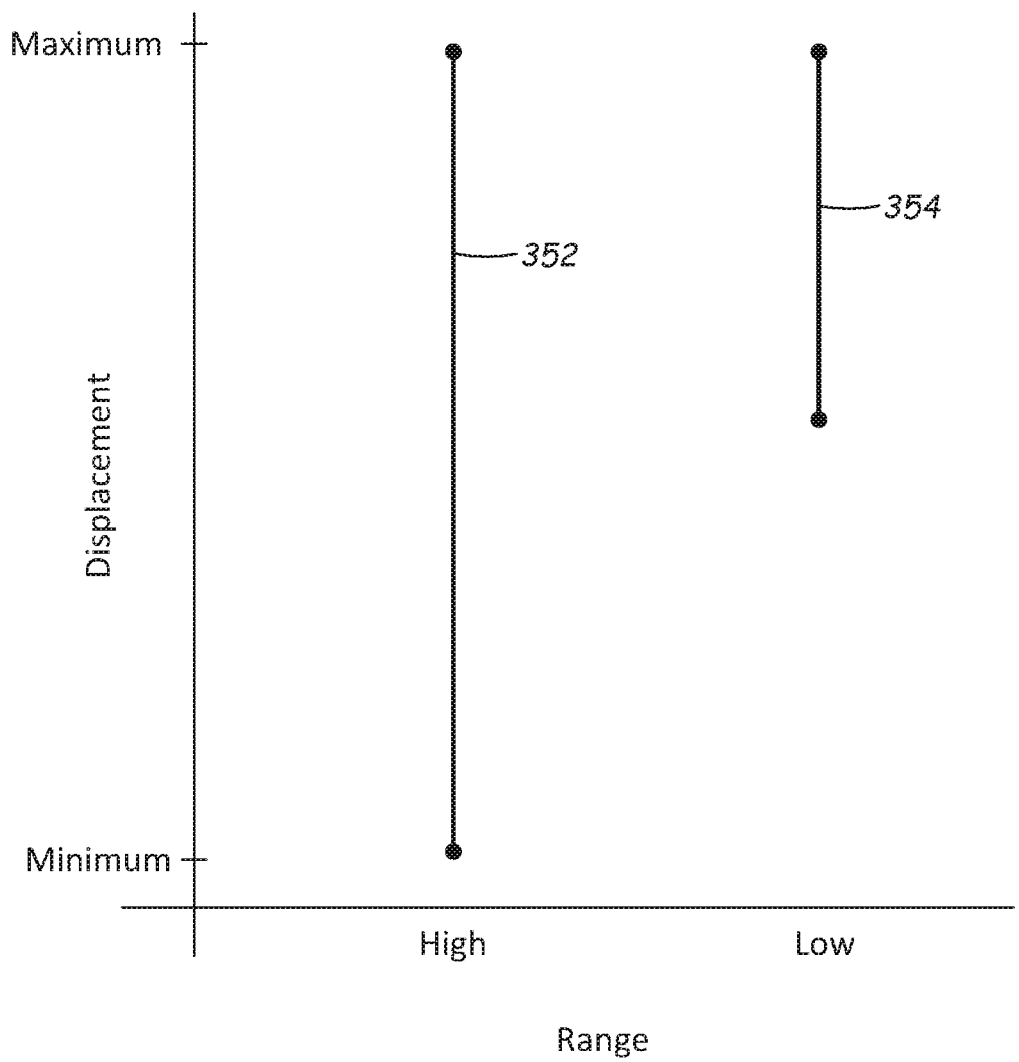
FIG. 6 is a graph depicting operational displacement ranges of the hydraulic motor of FIG. 5 according to some embodiments disclosed herein.

In some embodiments, bounds of displacement ranges (e.g., the upper and lower bounds of the high and low ranges of FIG. 6) may be fixed. For example, the maximum and minimum displacements of one or more displacement ranges may be predefined and stored in the control device 340. In some embodiments, the bounds of displacement ranges can be updated during operation of the power machine. For example, the bounds of a high, low, or other displacement range can sometimes be updated based on various operating conditions, such as, for example, a travel or engine speed of the power machine, current states of a hydraulic drive circuit (e.g., fluid pressure or temperature), operator demands or operator identifiers, and so on.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method of implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Correspondingly, some embodiments can include a method for control of run-time operation of a power machine that includes a hydraulic drive circuit with a variable displacement hydraulic drive motor (e.g., the infinitely variable displacement drive motor 326 of the power machine 200, as discussed above). As one example, shown in FIG. 7, a method 400 can include receiving 410, at a control device, one or more signals indicating one or more of a commanded travel speed for the power machine or an output torque associated with an infinitely variable displacement hydraulic drive motor of a hydraulic drive circuit of the power machine. For example, an electronic or electro-hydraulic control can receive electrical or hydraulic signals that correspond to an operator input that commands a travel speed for a work machine or that correspond to a torque provided by an associated drive motor. With regard to output torque in particular, in some implementations, the corresponding signals may be provided by a pressure sensor that is configured to sense pressure for the relevant hydraulic drive circuit, with the sensed pressure corresponding to torque according to known hydraulic principles. In other implementations, however, other types of signals can be received.

Figure 7:
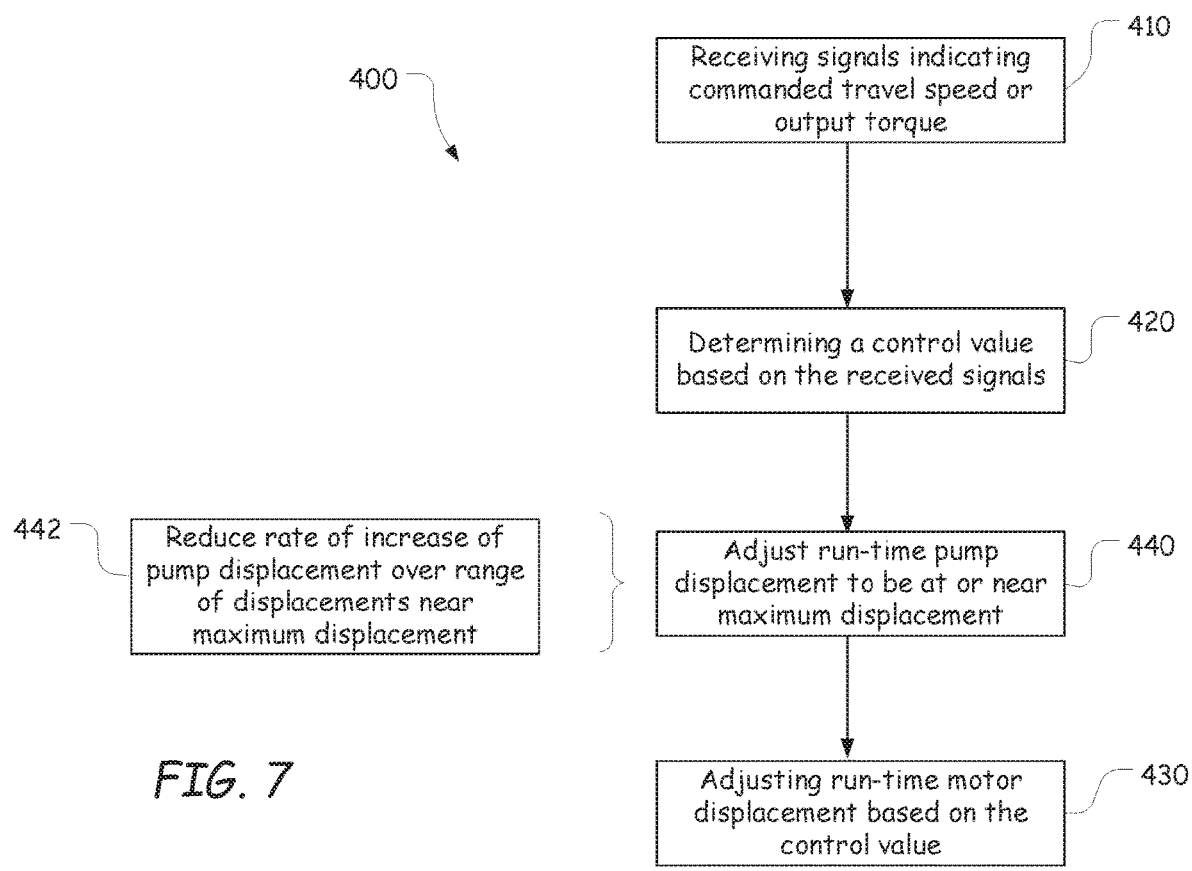
FIG. 7 is a schematic representation of a method for controlling displacement of a hydraulic motor according to some embodiments disclosed herein.

Still referring to FIG. 7, the method can further include, using the received 410 signals to determine (e.g., calculate) 420 a control value for the hydraulic drive motor, and adjusting 430 a run-time displacement for the hydraulic drive motor based on the control value. In some implementations, a determined 420 control value may be a target run-time displacement and a control device can then provide an appropriate signal, using known approaches, to cause the drive motor to operate at the target run-time displacement. In some implementations, a determined 420 control value may be a value that does not directly represent displacement, but can be used to control a drive motor to provide a particular displacement. For example, a determined 420 control value may be an index or other reference value for a look-up table, a gain value for a control signal, or other value that can be relayed, directly or indirectly, to a motor in order to controllably adjust run-time displacement.

As also discussed above, adjusting 430 a run-time displacement of a drive motor can sometimes correspond to a reduced travel speed of the power machine relative to the commanded travel speed. For example, in some implementations, a control value can be determined 420 based on received 410 signals that correspond to commanded travel speed (e.g., signals from operator inputs) and to output torque (e.g., pressure signals from a drive circuit), but output torque may be prioritized over commanded travel speed to determine 420 a relevant control value. Correspondingly, although adjustments based on output torque may correspond to a run-time displacement that is larger than would provide a commanded travel speed, the larger run-time displacement that is associated with the output torque adjustment may nonetheless be commanded, with a resulting decrease in actual travel speed relative to the commanded travel speed. Indeed, in some implementations, control of motor displacement based on output torque may be implemented regardless of any corresponding decrease (or other effect) on travel speed.

In some implementations, adjusting 430 run-time displacement can include increasing or decreasing run-time displacement in response to the received 410 signals that indicate that a particular threshold has been exceeded. For example, run-time displacement can sometimes be increased in response to output torque exceeding a threshold torque (e.g., as indicated by drive circuit pressure exceeding a pressure threshold). As another example, run-time displacement can sometimes be decreased in response to a commanded travel speed exceeding a speed threshold.

In some implementations, a run-time displacement can be adjusted 430 based on selection of a run-time displacement (e.g., via determination 420 of a corresponding control value) from within one of a plurality of overlapping displacement ranges. For example, a target run-time displacement can be selected from one of a first displacement range that exhibits a first minimum displacement or a second displacement range that exhibits a second, lower minimum displacement. In some cases, first and second displacement ranges can have a common maximum displacement. In some cases, a run-time displacement can be selected from any of multiple ranges, with a maximum displacement of the relevant range being selected as a default. In some case, once a particular displacement range has been selected, further adjustment 430 of run-time displacement may proceed for some time using displacements that are drawn only from that particular displacement range.

In some implementations, control of run-time displacement of a hydraulic drive motor for a hydraulic drive circuit may be coordinated with control of run-time displacement of a hydraulic drive pump of the hydraulic drive circuit. For example, for some run-time operations, a run-time displacement of a hydraulic drive motor may be adjusted (e.g., decreased) from an initial value only after a run-time displacement of an associated hydraulic drive pump is increased to be at or near a maximum pump displacement. This coordinated control may help to reduce system shocks or other adverse effects that may otherwise result as motor displacement is decreased, particularly during a switch between maximum motor displacement and maximum pump displacement.

FIG. 7 illustrates an example implementation, as part of the method 400, of coordinated control of pump and motor displacement for a run-time operation of a power machine. In particular, in some implementations, the method 400 includes adjusting 430 a run-time displacement for the hydraulic drive motor for a run-time operation after a run-time displacement of the associated hydraulic pump has been adjusted 440 to be at or near a maximum pump displacement. (As used herein in this context, "near" indicates within about 10% of maximum displacement; in other embodiments, "near" can indicate within 15%, 5%, or 2.5% of maximum displacement). The rate displacement change of the displacement of the hydraulic motor while the pump displacement is still changing is selected to enable a smooth transition between the pump and motor displacement change. By a smooth transition, it is meant that the loader will smoothly accelerate and the change from pump displacement control to motor displacement control will not be evident to the operator.

Correspondingly, in some implementations, run-time displacement of a hydraulic drive pump may be increased 440 from a relatively low value to a value at or near a maximum pump displacement before run-time displacement of a hydraulic drive motor is decreased 430 from a maximum (or other initial) displacement value. Further, for some operations, run-time displacement of a hydraulic drive motor may be initially decreased from an initial maximum displacement only as run-time displacement of the hydraulic drive pump is increased, through a range of hydraulic displacements near the maximum pump displacement, to approach the maximum pump displacement.

Continuing, in some implementations, a rate of adjustment of run-time pump displacement or of run-time motor displacement can be further controlled (e.g., reduced) during select portions of certain run-time operations. As also shown in FIG. 7, for example, a rate of increase of run-time pump displacement can be reduced 442 as the pump displacement is continuously increased near the maximum pump displacement. Among other benefits as mentioned above, this controlled rate reduction may particularly help smooth a transition between maximum motor displacement and maximum pump displacement (e.g., during a commanded increase in travel speed for a power machine).

Figure 8:
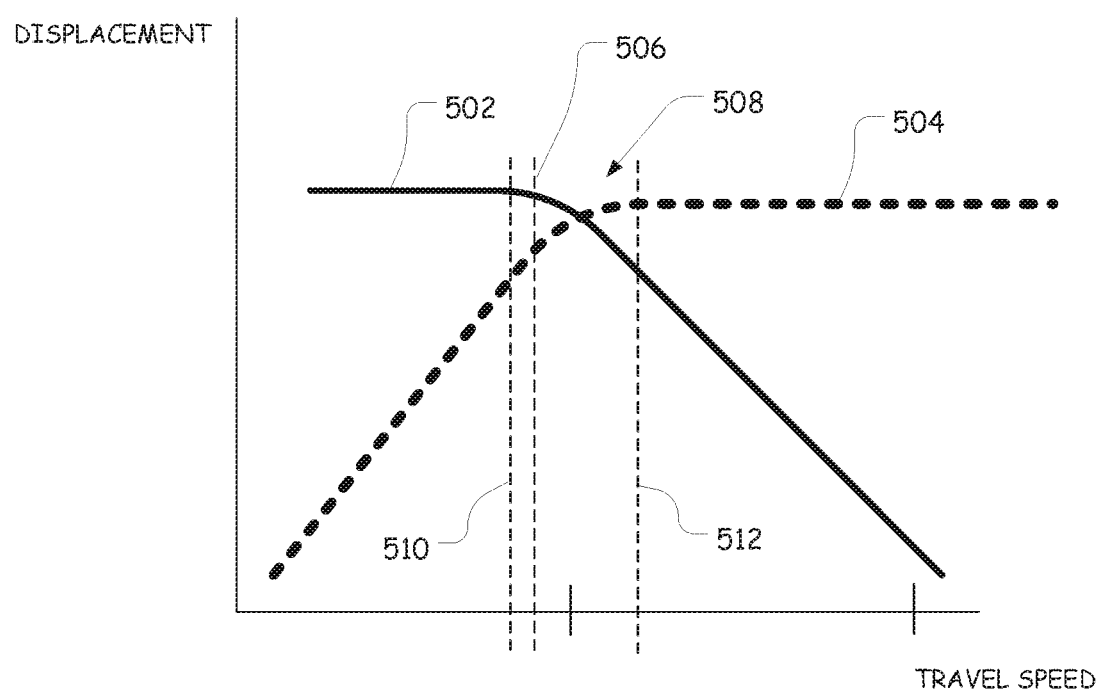
FIG. 8 is a graph depicting run-time displacement of a hydraulic pump and a hydraulic motor of a hydraulic drive circuit during operation of a power machine according to some embodiments disclosed herein.

In this regard, FIG. 8 illustrates an example implementation of some aspects of the method 400 (see FIG. 7), during an increase in travel speed for a power machine. Initially, at low travel speeds, motor displacement 502 is at a maximum (e.g., as a default, as also discussed above) and pump displacement 504 is at a minimum. Due to a commanded increase in travel speed, the motor displacement 502 may eventually be reduced 440, corresponding to increasing travel speed for the power machine. However, in the illustrated implementation, the motor displacement 502 is not reduced from the initial maximum value until after the pump displacement 504 is first increased 440 to be near (e.g., within 10% of) the maximum pump displacement, as indicated by reference line 506. Additionally, to reduce potential shocks from the transition between maximum motor displacement and maximum pump displacement, a rate of increase of the pump displacement 504 is reduced 442 over a range 508 of displacements between reference lines 510, 512.

In the illustrated example, the range 508 of displacement over which the rate of increase in the pump displacement 504 is reduced extends from approximately 90% of maximum pump displacement to 100% of maximum pump displacement and the motor displacement 502 is initially reduced once the pump displacement 504 has reached approximately 90% of the maximum pump displacement. However, in other cases, reduced rates of adjustment of pump displacement can be implemented over other ranges and reductions in motor displacement can begin when pump displacement is otherwise near a maximum. Further, the particular rates of adjustment of the displacements 502, 504, the relative scale of the displacements 502, 504, and the cooperative and individual relationships of the displacements 502, 504 to travel speed are all presented as examples only. A variety of other rates, scales, and relationships are possible in other implementations. Additionally, similar adjustments according to the general principles disclosed above may sometimes be made relative to other initial displacements or during other run-time operations, including during decreases in travel speed or for other changes in operating states of a power machine.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Although the present invention has been described by referring preferred embodiments, workers skilled in the art will recognize that changes may be made in form and detail without departing from the scope of the discussion.

What is claimed is:

1. A power machine having a frame, a power source supported by the frame, and a power conversion system including a hydraulic drive system operably coupled to the power source and configured to power at least one tractive element, the hydraulic drive system comprising:
- a hydraulic circuit that includes a hydraulic pump in hydraulic communication with a hydraulic motor, the hydraulic motor being configured to operate with infinitely variable displacement to drive the power machine; and
- a control device that is configured to:
  - determine a control value based on one or more of: a commanded travel speed for the power machine or a pressure in the hydraulic circuit; and
  - selectively operate the hydraulic motor within a first displacement range or a second displacement range that is different from the first displacement range, the first displacement range having a first minimum displacement and a first maximum displacement and the second displacement range having a second minimum displacement and a second maximum displacement, the first maximum displacement being the same as the second maximum displacement and the first minimum displacement being smaller than the second minimum displacement;
  - wherein operating the hydraulic motor within the first and second displacement ranges includes:
    - changing a run-time displacement of the hydraulic motor based upon the determined control value, including preventing a maximum run-time displacement from exceeding the first or second maximum displacement, respectively, and preventing a minimum run-time displacement from being below the first or second minimum displacement, respectively.

2. The power machine of claim 1, wherein the control device is configured to implement, as a default, operation of the hydraulic motor at the first or second maximum displacement of the first displacement range or the second displacement range, respectively.

3. The power machine of claim 1, wherein the control device is configured to increase the run-time displacement of the hydraulic motor in response to the pressure in the hydraulic circuit being above a given threshold.

4. The power machine of claim 1, wherein the control device is configured to decrease the run-time displacement of the hydraulic motor in response to the commanded travel speed being above a given threshold.

5. The power machine of claim 1, wherein the control device is configured to control the run-time displacement of the hydraulic motor based on the commanded travel speed and the pressure in the hydraulic circuit, with the pressure in the hydraulic circuit having priority over the commanded travel speed for changing the run-time displacement of the hydraulic motor.

6. The power machine of claim 1, wherein the hydraulic circuit is a hydrostatic drive circuit.

7. A hydraulic drive system for use in a power machine, the hydraulic drive system comprising:
- a hydraulic circuit that includes a hydraulic pump in hydraulic communication with a hydraulic drive motor, the hydraulic drive motor being configured to operate with infinitely variable displacement to drive the power machine; and
- a control device that is configured to:
  - determine an output torque value associated with the hydraulic drive motor; and
  - selectively operate the hydraulic drive motor in either of a first displacement range or a second displacement range that overlaps with, but is different from, the first displacement range, the first displacement range having a first minimum displacement and a first maximum displacement and the second displacement range having a second minimum displacement and a second maximum displacement;
  - wherein operating the hydraulic drive motor within the first and second displacement ranges includes:
    - adjusting a run-time displacement of the hydraulic drive motor based upon the determined output torque value to run-time displacement values that are only within the first or second displacement range, respectively, including limiting a maximum run-time displacement based on the first or second maximum displacement, respectively, and limiting a minimum run-time displacement based on the first or second minimum displacement, respectively.

8. The hydraulic drive system of claim 7, wherein the control device is configured to adjust the run-time displacement of the hydraulic drive motor based upon the determined output torque value, regardless of effect on travel speed for the power machine.

9. The hydraulic drive system of claim 7, wherein a maximum displacement of the first displacement range is the same as a maximum displacement of the second displacement range; and
- wherein a minimum displacement of the first displacement range is lower than a minimum displacement of the second displacement range.

10. The hydraulic drive system of claim 7, wherein the control device is configured to implement, as a default, operation of the hydraulic drive motor at the first or second maximum displacement, respectively, of the selected first or second range.

11. The hydraulic drive system of claim 7, wherein the control device is configured to increase the run-time displacement of the hydraulic drive motor based on the determined output torque value exceeding a threshold torque value.

12. The hydraulic drive system of claim 11, wherein the control device is configured to determine that the output torque value exceeds a threshold torque value based on determining that a pressure in the hydraulic circuit exceeds a threshold pressure value.

13. A method of controlling run-time operation of a drive system of a power machine, the method comprising:
- receiving, at a control device, one or more signals indicating one or more of a commanded travel speed for the power machine or an output torque associated with an infinitely variable displacement hydraulic pump and an infinitely variable displacement hydraulic drive motor of a hydraulic drive circuit of the power machine;
- determining, using the control device, a control value for the hydraulic drive motor, based on the one or more signals; and
- selectively operating the hydraulic drive motor within either of a first displacement range or a second displacement range that overlaps with but is different from the first displacement range, including: adjusting a run-time displacement for the hydraulic drive motor, using the control device, based on the control value and, respectively, the first or second displacement range, such that a maximum run-time displacement and a minimum run-time displacement are limited by the first or second displacement range, respectively.

14. The method of claim 13, wherein the one or more signals indicating the output torque include one or more signals indicating a sensed pressure in the hydraulic drive circuit.

15. The method of claim 13, wherein the one or more signals are received from an operator input device to indicate the commanded travel speed and adjusting the run-time displacement corresponds to a reduced travel speed of the power machine relative to the commanded travel speed.

16. The method of claim 13, wherein adjusting the run-time displacement includes one or more of:
increasing the run-time displacement in response to a pressure in the hydraulic drive circuit being above a pressure threshold; or
decreasing the run-time displacement in response to the commanded travel speed being above a speed threshold.

17. The method of claim 16, wherein the control value is determined with the output torque being prioritized over the commanded travel speed.

18. The method of claim 13, wherein the first displacement range and the second displacement range have a common maximum displacement corresponding to a maximum possible displacement for the hydraulic drive motor and a minimum displacement of the first displacement range is lower than a minimum displacement of the second displacement range.

19. The method of claim 13, wherein the run-time displacement for the hydraulic drive motor is adjusted based on the control value after the control device adjusts a run-time displacement of the hydraulic pump to be at or near a maximum pump displacement.

20. The method of claim 19, wherein adjusting the run-time displacement for the hydraulic drive motor includes reducing the run-time displacement of the hydraulic drive motor as the run-time displacement of the hydraulic pump is increased through a range of hydraulic displacements near the maximum pump displacement to approach the maximum pump displacement.

21. The method of claim 20, wherein, when the displacement of the hydraulic pump has been increased to reach the range of hydraulic displacements near the maximum pump displacement, a rate of increase of the hydraulic pump displacement is reduced.

* * * * *